United States Patent [19]

Demazeau et al.

[11] 4,092,439
[45] May 30, 1978

[54] PROCESS FOR OBTAINING CHROMIUM DIOXIDE $CRO_2$

[75] Inventors: Gérard Demazeau, Gradignan; Patrick Maestro, Le Bouscat; Théophile Plante, Pessac; Michel Pouchard, Blanquefort; Paul Hagenmuller, Talence, all of France

[73] Assignee: Agence Nationale de Valorisation de la Recherche (ANVAR), Neuilly sur Seine, France

[21] Appl. No.: 730,389

[22] Filed: Oct. 7, 1976

[30] Foreign Application Priority Data

Oct. 10, 1975 France ............................... 75 31056
Sep. 30, 1976 France ............................... 76 29472

[51] Int. Cl.² ............................................. C01G 37/02
[52] U.S. Cl. ................................. 423/607; 252/62.51
[58] Field of Search ....................... 423/607; 252/62.51

[56] References Cited

U.S. PATENT DOCUMENTS

| | | | |
|---|---|---|---|
| 3,278,263 | 11/1966 | Cox | 423/607 |
| 3,529,930 | 9/1970 | Bottjer et al. | 252/62.51 |
| 3,778,373 | 12/1973 | Robbins | 252/62.51 |
| 3,929,978 | 12/1975 | Morero et al. | 252/62.51 |
| 3,954,641 | 5/1976 | Kawamata et al. | 252/62.51 |
| 3,956,151 | 5/1976 | Kawamata et al. | 252/62.51 |

FOREIGN PATENT DOCUMENTS 754,464   3/1967   Canada ............................. 252/62.51

*Primary Examiner*—Herbert T. Carter
*Attorney, Agent, or Firm*—Oblon, Fisher, Spivak, McClelland & Maier

[57] ABSTRACT

Chromium dioxide $CrO_2$ is prepared by oxidizing hydrated trivalent chromium oxide $Cr_2O_3, xH_2O$, where $x$ is at least 1, at a temperature of at least 350° C and under pressures of at least 2 kilobars. The reaction is carried out in an oxidizing medium, which is a solid or an aqueous liquid solution, essentially constituted by a compound of the formula $HXO_y, zH_2O$, wherein X represents an atom of chlorine or iodine, $y$ is a positive integer less than or equal to 4, and $z$ is a number which is a function of the dilution of said compound in the solution or a function of the crystallization water in the case of a solid oxidizing agent.

The product is useful in any device requiring a compound which is ferromagnetic at a temperature less than 116° C and notably in magnetic tapes.

13 Claims, No Drawings

PROCESS FOR OBTAINING CHROMIUM DIOXIDE CRO₂

BACKGROUND OF THE INVENTION

1. Field of the Invention

The present invention relates to a process for obtaining chromium dioxide $CrO_2$ and to the thus obtained chromium dioxide.

2. Description of the Prior Art

Processes for the preparation of chromium dioxide are known, which can be classed in two broad categories of processes comprising respectively:

reduction to a degree of oxidation + IV of chromium at a higher degree of oxidation, and oxidation of chromium at a lower degree of oxidation to the degree + IV.

It is in particular the methods of preparation belonging to the first of these categories which have been most developed, since oxidation precesses are generally more delicate to carry out industrially. The starting materials can then be $CrO_3$ or any other compound containing chromium at a higher degree of oxidation than + IV.

Thus, G. LORTHIOIR and A. MICHEL (Bull. Soc. Chim. Fr., (4) 1166, 1965) have shown that small amounts of $CrO_2$ appear in the products resulting from the thermal decomposition of $CrO_3$, under atmospheric pressure.

In U.S. Pat. Nos. 2,885,365; 2,923,683 and 2,956,955, as well as in J. Appl. Phys. Suppl. 32 (3), 374, (1961), T. J. SWOBODA et al. describe the preparation of pure $CrO_2$ by reduction of $CrO_3$, through hydrothermal synthesis under high pressures P(0.5 P < 3 kilobars; 400° C < temperature T < 525° C).

On the other hand, oxygen pressures corresponding to the $CrO_3$– $CrO_2$ equilibrium were studied by B. KUBOTA (J. Phys. Soc. Japan 15, 1706 (1960) and J. Am. Ceram. Soc. 44, 239 (1961)) Y. GOTO and T. KITAMURA (J. Japan Soc. Powder Met., 9, 109 (1962)), R. ROY and W. B. WHITE (High Temperature Technology (Butterworths, London, 1964) p. 235) and S. SOMIYA, S. S YAMAOJA and S. SAITO (Bull. Tokyo Institute of Technology, 66, 91 (1965)).

$CrO_2$ has also been obtained by N. KAWAI et al. (Japan K. Appl. Phys., 6 (12), 1397, (1967)), by decomposition of $CrO_3$ under very high pressures (15 < P < 85 kilobars, 380° C. < T < 1500° C).

Various authors have obtained $CrO_2$ by the decomposition of chromyl chloride $CrO_2Cl_2$, notably K. J. de Vries (Naturwissenschaften, 54, (21), 563, (1967)), under a low oxygen pressure (5 to 25 bars). E. A. GYUNNER et al (Russian J. of Inorg. Chem. 12 (8) 1181 (1967), English translation of Zh. NEORG; KHIM, 12, (8), 2244 (1967)) have observed the formation of $CrO_2$ in the $K_2Cr_2O_7$-$N_2H_4$-1HCl-$H_2O$ system.

In addition, the processes by oxidation can bring into play two methods:

either a method using oxygen under high pressures, or a method utilizing an oxidizing agent.

A method consisting of oxidation in the solid phase of $CrO_2$, n$H_2O$ under high oxygen pressure has been described by N. L. COX in U. S. Pat. No. 3,278,263 and by R. ROY et al. in "Seventh Quarterly Progress Report on Crystal Chemistry Studies — May 1 – July 31, 1963, Materials Research Laboratory, the Pennsylvania State University, University Park, Pa., USA" and by Y. SHIBASAKI, F. KANAMARU, M. BOISUMI, K. ADO and S. KUME, Mat. Res. Bull. 5, 1051 (1970).

However, on account of the difficulties inherent in the necessary compression of the oxygen, it is not possible to envisage the use of the last method industrially. In fact, oxygen presents real dangers in handling under high pressures, when the compressed volume becomes considerable, which constitutes a serious obstacle to the possibility of industrial applications connected with this first method of oxidation. For this reason, the use of other oxidising agents seemed to offer an attractive route for the industrial synthesis of $CrO_2$.

Oxidation in the liquid medium was envisaged by N. L. COX (U.S. Pat. No. 3,278,263), but by means only of either hydrogen peroxide $H_2O_2$, or the oxide $CrO_3$ already mentioned. Now hydrogen peroxide, $H_2O_2$, is difficult to apply efficiently on the industrial scale (and this all the more since the operating conditions which are then imposed are severe), since $H_2O_2$ is easily decomposed at ordinary temperature, and chromic anhydride $CrO_3$ is troublesome to use on account of its hydroscopicity.

As regards the only method which is at present industrially utilizable, namely the reduction by hydrothermal synthesis of $CrO_3$, it must be observed that considerable difficulties of application arise from the delicate handling of the starting materials $CrO_3$, since as has been indicated above, the latter is very hydroscopic.

On the other hand it is necessary to come back to U.S. Pat. No. 3,278,263 mentioned above to note that, according to N. L. COX, any oxidizing agent would, in principle, be effective to oxidize the oxide or the hydroxide of chromium + III or the hydrates thereof, under the operational conditions specified in this patent and to produce a ferromagnetic chromium dioxide $CrO_2$. It must be noted that any theoretically usable oxidizing agent cannot be effective for this purpose, since any oxidizing agent cannot give rise to any particular oxidation. Thus the use of oxidizing agents introducing metallic cations (such as $KClO_3$, for example) lead under the experimental conditions of temperature and pressure generally required for the preparation of $CrO_2$, principally to oxygenated combinations of chromium + IV or to chromium at a degree of oxidation higher than + IV, with only the theoretical possibility that a certain (minor) percentage of $CrO_2$ accompanies these products. Even when $CrO_2$ is obtained thereby, it is only the by-product of a reaction for the production of other chromium compounds.

Far from being guided by the teachings of this patent, which in reality only describe three oxidizing reagents, which have been discussed above, or by all the other publications on this subject, whose wide variety in recognized method has rather the effect of misleading and discouraging researches, those with ordinary skill in the art were rather in difficulties what course to take to advance the industrial synthesis of ferromagnetic $CrO_2$.

In this respect, the use of compounds or of derivatives of the perhalogenic acid type appear at first sight, to those with ordinary skill in the art, quite unadvisable on account of the instability of these compounds, which were moreover not proposed in any of the publications mentioned above. Thus the perchlorate, even more than the chlorate, have the reputation and the property of being dangerous explosives, even under ordinary pressure, especially and precisely in the presence of oxidisable elements (hence reducing agents).

SUMMARY OF THE INVENTION

It is an object of the invention to provide an improved method for the production of chromium dioxide $CrO_2$.

It is another object of the invention to provide a method which overcomes the above-mentioned drawbacks.

It is a further object of the invention to provide an improved ferromagnetic chromium dioxide.

Other objects and advantages of the present invention will emerge from the further description which follows.

According to the invention, it has now been found unexpectedly, that it is possible to prepare pure chromium dioxide $CrO_2$ industrially, essentially by oxidation under high pressures, in a given oxidizing medium, from hydrated trivalent chromium oxide.

According to the invention, there is provided a process for obtaining pure chromium dioxide $CrO_2$, consisting essentially of oxidizing hydrated trivalent chromium oxide $Cr_2O_3$, $xH_2O$, where $x$ is at least 1, at a temperature of at least 350° C and under pressures of at least 2 kilobars in an oxidizing medium, which is solid or in aqueous liquid solution, essentially constituted by a compound of the formula $HXO_y$, $zH_2O$, wherein X represents a chlorine or iodine atom, $y$ is a positive integer less than or equal to 4 and $z$ is a number which is a function of the dilution of said compound in the solution or a function of the crystallisation water in the case of a solid oxidizing agent.

The hydrated trivalent chromium oxide utilized may be prepared by any known means and notably by the addition of ammonia to a solution of trivalent chromium chloride.

In the latter case, after washing with water, in order to remove the ammonium chloride formed, it is appropriate to dry the collected hydrated trivalent chromium oxide in an oven. The chromium content of the latter is then determined by a thermogravimetric method, by determination of the weight of $Cr_2O_3$ formed on dehydration by the action of suitable heating.

The oxidizing medium utilized according to the invention may notably be constituted essentially by an iodine compound selected from among $HIO_4$, $z'H_2O$, wherein $z'$ is a number generally equal to 2 or about 2 (and in particular $H_5IO_6$ or, which comes to the same thing, $HIO_4$, $2H_2O$) and iodic acid $HIO_3$. These oxidizing agents occur in the form of two white solids which are easily handled.

The process according to the invention is then based on the following respective reaction formulae (unbalanced):

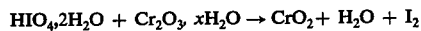

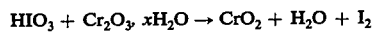

In practice, the oxidizing agent and the hydrated trivalent chromium oxide are intimately mixed, then subjected to a temperature of at least 350° C, and preferably from 400 to 500° C, and under a pressure of at least 2 kilobars, and preferably of about 2.5 to 4 kilobars. However, in order to avoid the formation of interfering phases which would contaminate the $CrO_2$ formed, notably by the effect of the reactivity of the iodine in a concentrated medium and under the experimental conditions used, it is preferable to add water (called below dilution water) to the starting materials; in fact, the water arising from the dehydration of the one or more hydrated starting materials may be insufficient.

When dihydrated periodic acid $HIO_4$, $2H_2O$ is used, the weight of oxidizing agent applied must correspond, under the optimum experimental conditions, to about three times the weight of chromium contained in the hydrated trivalent chromium oxide. The weight of the dilution water used is, for its part, advantageously from about one to three times the said weight of oxidizing agent.

The use of iodic acid $HIO_3$ is however preferred to that of periodic acid. In this case, where $HIO_3$ is used, the weight of oxidizing agent used represents advantageously from about 1.4 to 2 times the weight of chromium contained in the hydrated trivalent chromium oxide. The weight of water used for dilution advantageously represents from about one to three times said weight of oxidizing agent.

When $HIO_4$, $z'H_2O$ or $HIO_3$ is used, the product obtained, once the reaction according to the invention is terminated, occurs in the form of a powder which is black in color. The iodine formed during the reaction (and which results from the fact that the hydroiodic acid first formed is particularly unstable), can be removed by washing with water or with alcohol. This iodine formed can then be recovered by any industrial method which may be convenient.

Radiocrystallographic analysis of the powder obtained shows that it is exclusively the chromium dioxide $CrO_2$ formed of black microcrystals of rutile structure. This chromium dioxide obtained in this manner is ferromagnetic at ambient temperature and it has a Curie temperature of about 116° C. It is essentially useful for the production of any device requiring a compound which is ferromagnetic at a temperature below 116° C, and in particular for the manufacture of chromium dioxide-based magnetic tapes.

The oxidising medium applied according to the invention is, but less advantageously, also constituted by aqueous solutions of a chlorine oxyacid $HClO_y$, $zH_2O$, wherein $y$ is a whole number less than or equal to 4 and where $z$ is a function of the dilution of the acid in the solution, and preferably by aqueous solutions of $HClO_4$, $z'H_2O$ ($z'$ being a function of the dilution of the acid in the solution). Said solution comprises advantageously about 70 to 10 weight percent, and most advantageously about 30 to 20 weight percent, of pure acid; actually, too much concentrated solutions would be liable to attack the container, whereas too much diluted solutions might hinder the formatin of well crystallized $CrO_2$.

According to this embodiment, the process is based on the following reaction diagram (unbalanced):

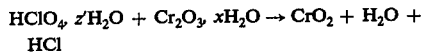

According to an advantageous embodiment of the process according to the invention, the oxidizing liquid medium used represents, by weight, about 1.4 to 2 times the weight of chromium contained in the hydrated trivalent oxide, (too large an excess of oxidizing solution being liable to encourage an attack on the container), whilst the acid represents about 30% by weight of said oxidizing liquid medium.

The pressure to which the reaction vessel must be subjected is at least two kilobars (namely from at least about 2,000 atmospheres) and preferably about 2.5 to 4 kilobars, whilst the temperature of the treated material is at least 350° C, and advantageously from about 400° to 500° C.

The product obtained, once the reaction has been completed, is in the form of black acicular microcrystals, whose radiocrystallographic analysis has shown that it is exclusively chromium dioxide $CrO_2$ of rutile structure, ferromagnetic at ambient temperature and whose Curie temperature is at least equal to 120° C.

This product is essentially useful for the production of any device requiring a compound ferromagnetic at a temperature below 120° C, and in particular as a special coating for chromium dioxide based magnetic tapes.

The product obtained according to the invention is pure and undoped under normal operational conditions, however it may be doped by any suitable means known to those with ordinary skill in the art. The Curie temperatures indicated above correspond to this indoped product; any doping, even slight, may result in a change in the Curie temperature.

EXAMPLE 1

For a weight of 1 g of chromium contained in hydrated trivalent chromium oxide occurring in the form of a green powder in a noble metal container (in the present case, of gold) having a thickness of only 0.1 to 0.2 mm. there was added, as an oxidizing liquid medium or oxidizing solution, about 1.1 ml of an aqueous solution of perchloric acid containing substantially 30% by weight of pure acid, this dilution avoiding an attack on the container. Said oxidizing solution and the chromium contained in the hydrated trivalent chromium oxide were respectively in the ratio by weight of 1.4. The container was then hermetically sealed and placed in a reaction vessel, where it was subjected to an external pressure of about 3,000 to 3,500 bars and to a temperature of about 440° C, for a maximum period of 48 hours.

The product obtained was exclusively constituted by black microcrystals of $CrO_2$, which all appeared to be of rutile structure on radiocrystallographic analysis and possessed a Curie temperature of about 123° C, being ferromagnetic at ambient temperature.

EXAMPLE 2

For 1 g of chromium in hydrated trivalent chromium oxide placed in a reaction vessel sheathed by a metal which is resistant particularly to acids, there was added, as an oxidizing solution, about 1.6 ml of an aqueous solution of perchloric acid containing substantially 30% by weight of pure acid. Said oxidizing solution and the chromium contained in the hydrated trivalent chromium oxide were respectively in the proportion of 2 by weight. Pressurization was affected by the addition of a quantity of water by means of a diaphragm pump, so that the pressure reached about 700 bars at ambient temperature, which enabled substantially 3,500 bars to be obtained when the temperature was brought to about 440° C. This temperature was maintained for about 48 hours.

Experience has shown that the addition of water during the pressurisation does not interfere with the formation of $CrO_2$ up to the obtaining of solutions containing about 15 to 20% of pure acid.

The product obtained was similar to that described in Example 1.

EXAMPLE 3

For 1 g of chromium in hydrated trivalent chromium oxide placed in a noble metal container (in the present case, of gold) and of a thickness of only 0.1 to 0.2 mm, there was added, as an oxidizing agent, 2 g of iodic acid $HIO_3$ in the form of a white powder. To these starting materials, 2 g of water were added. The container was then hermetically sealed and placed in a reaction vessel, where it was subjected to an external pressure of about 2700 to 3000 bars and to a temperature of about 440° C, for a period of the order of 15 hours.

The product obtained was exclusively $CrO_2$ of rutile structure with a Curie temperature of 116° C.

EXAMPLE 4

For 1 g of chromium contained in hydrated trivalent chromium oxide placed in a reaction vessel sheathed by a metal which is particularly resistant to acid and notably to iodic acid, there was added, as an oxidizing agent, a weight of about 1.9 of iodic acid $HIO_3$ and 5 g of water for the dilution of the whole. These compounds were then subjected to a pressure of 2500 to 3000 bars and to a temperature of about 440° C for about 20 hours.

The product thus obtained was similar to that prepared according to Example 3.

EXAMPLE 5

For 1 g of chromium contained in hydrated trivalent chromium oxide placed in a noble metal container, there was added, as an oxidizing agent, about 3 g of periodic acid $H_5IO_6$ (or $HIO_4, 2H_2O$) in the form of a white powder. To these solid starting materials, 3 g of water were added. The container was then hermetically sealed and placed in a reaction vessel, were it was subjected to an external pressure of 2700 bars and to a temperature of 450° C, for a period of 24 hours.

The product thus obtained was similar to that prepared according to Example 3.

What we claim is:

1. A process for obtaining pure chromium dioxide, consisting essentially of:

oxidizing hydrated trivalent chromium oxide of the formula $Cr_2O_3 \cdot xH_2O$, wherein $x$ is at least 1, at a temperature of at least 350° C and at pressures of at least 2 kilobars, in an oxidizing medium which is a solid or an aqueous liquid solution, containing an oxidizing agent of a compound of the formula $HXO_y \cdot zH_2O$, wherein X represents chlorine or iodine, $y$ is a positive integer up to and including 4, and $z$ is a number which is a function of the dilution of said oxidizing compound in the solution or a function of the crystallization water in the case of a solid oxidizing agent.

2. The process according to claim 1, wherein said hydrated trivalent chromium oxide is prepared by adding ammonia to a solution of trivalent chromium chloride, washing the trivalent chromium oxide obtained with water to remove the ammonium chloride formed and drying said washed chromium oxide.

3. The process according to claim 1, wherein said oxidizing agent is an iodine compound selected from the group consisting of $HIO_3$ and $HIO_4 \cdot z'H_2O$, wherein $z'$ is a number equal to 2 or of about 2.

4. The process according to claim 3, wherein said oxidizing medium is said iodine compound diluted with water.

5. The process according to claim 4, wherein said iodine compound is $HIO_4 \cdot 2H_2O$ which is reacted with said hydrated trivalent chromium oxide in an amount of about three times the weight of chromium present in said chromium oxide and wherein the weight of said diluting water ranges from one to three times the weight of the oxidizing agent.

6. The process according to claim 4, wherein said iodine compound is $HIO_3$ which is reacted with said hydrated trivalent chromium oxide in an amount of about 1.4 to 2 times the weight of chromium present in said chromium oxide and wherein the weight of said diluting water ranges from 1 to 3 times the weight of the oxidizing agent.

7. The process according to claim 3, wherein the oxidation is carried out at a temperature of about 400 to 500° C.

8. The process according to claim 7, wherein the oxidation is carried out at a pressure of about 2.5 to 4 kilobars.

9. The process according to claim 1, wherein said oxidizing agent is $HClOy \cdot zH_2O$, wherein $y$ is a positive integer up to and including 4 and $z$ is a function of the dilution of said agent in said aqueous liquid solution.

10. The process according to claim 9, wherein the oxidation is carried out at a temperature of about 400° to 500° C.

11. The process according to claim 10, wherein the oxidation is carried out at a pressure of about 2.5 to 4 kilobars.

12. The process according to claim 9, wherein the value of integer $y$ is four.

13. The process according to claim 12, wherein the weight of said oxidizing liquid medium is about 1.4 to 2 times the weight of chromium present in the hydrated trivalent oxide, while the oxidizing agent represents about 30% by weight of said oxidizing liquid medium.

* * * * *